March 14, 1944. C. E. TACK 2,343,941
BRAKE ARRANGEMENT
Filed Dec. 26, 1941 2 Sheets-Sheet 1
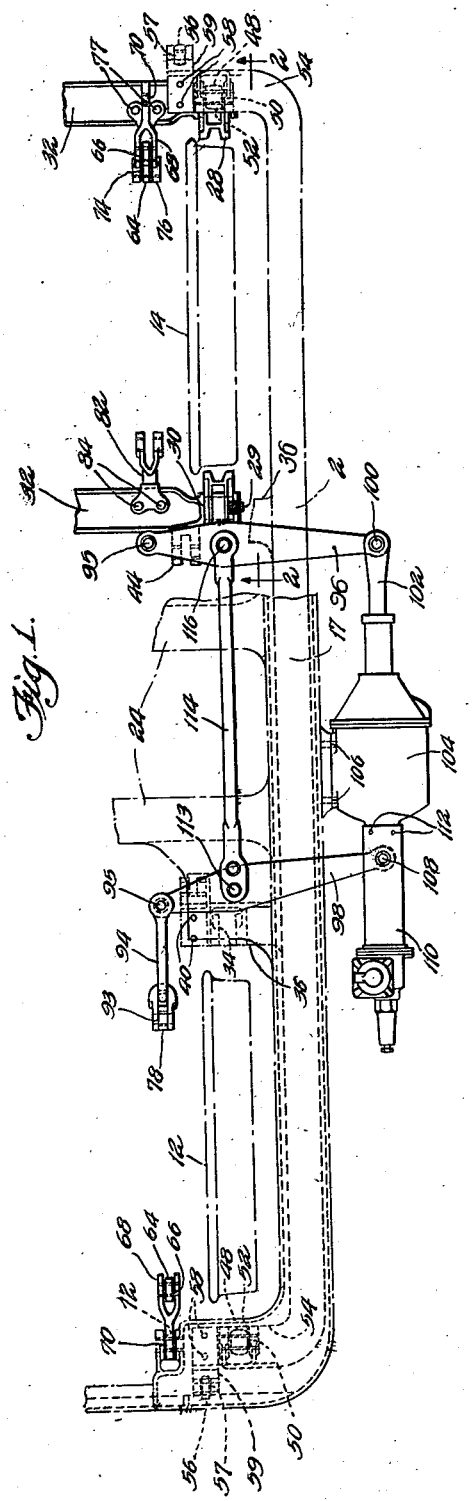
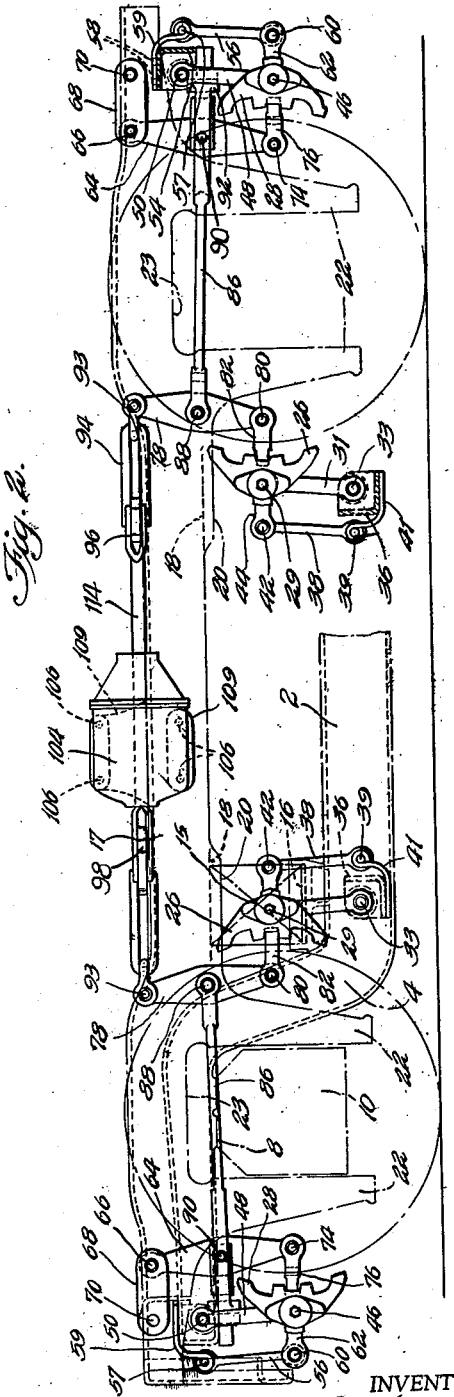
INVENTOR.
Carl E. Tack
BY March 14, 1944.  C. E. TACK  2,343,941
BRAKE ARRANGEMENT
Filed Dec. 26, 1941  2 Sheets-Sheet 2

INVENTOR.
Carl E. Tack
BY
Atty.

Patented Mar. 14, 1944

2,343,941

UNITED STATES PATENT OFFICE 2,343,941

BRAKE ARRANGEMENT

Carl E. Tack, Chicago, Ill., assignor to American Steel Foundries, Chicago, Ill., a corporation of New Jersey Application December 26, 1941, Serial No. 424,432

32 Claims. (Cl. 188—56)

My invention relates to improvements in brake rigging of the beam type for railway car trucks and having associated therewith that type of brake known as the clasp brake in which brake shoes are applied at opposite sides of each car wheel.

It is an object of my invention to provide a brake mechanism of the so-called beam type in which the brake cylinder or other actuating means is mounted on or carried by a truck frame.

It is a further object of my invention to provide such a brake mechanism in which the brake beams intermediate the wheels of a railway car truck are supported from the upper ends of brake hangers, the lower ends of which are mounted on a frame member of said truck.

Still another object of my invention is to diminish tipping of said truck by supporting the associated brake beams from equalizer members mounted on the journal boxes associated with the supporting wheel and axle assemblies.

My invention contemplates a car truck comprising a novel form of equalizer member having inwardly directed brackets at the ends thereof and a pair of inwardly directed brackets intermediate said ends, said brackets affording a support for brake hangers associated with the brake beams utilized in my novel brake mechanism.

Still another object of my invention is to design a brake arrangement such as that above described in which the brake beams supported outwardly of the wheels of a railway car truck are supported from the lower ends of hangers, the upper ends of which are connected to a frame member above the axle level, and in which the brake beams supported intermediate said wheels are connected to the upper ends of hangers, the lower ends of which are connected to a frame member at a point below said axle level.

In the drawings,

Figure 1 is a top plan view of a railway car truck embodying my novel brake arrangement, only one-half of the truck being shown inasmuch as it is similar at opposite sides thereof, and the upper frame member being partially cut away in order more clearly to illustrate the brake arrangement therebeneath.

Figure 2 is a side view of the structure shown in Figure 1 and partly in section as indicated by the line 2—2 of Figure 1, the connection of the cylinder levers to the power means and to the slack adjuster means being omitted as more clearly shown in Figure 1.

Figure 3:
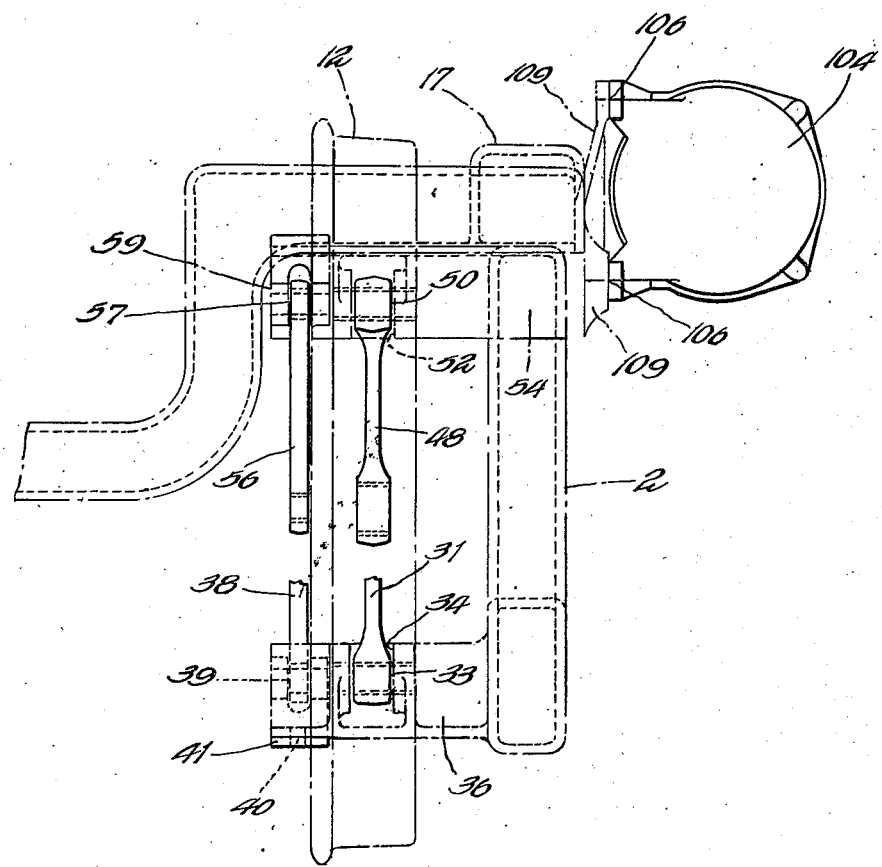
Figure 3 is an enlarged end elevation taken from the left as seen in Figures 1 and 2.

In each of said figures certain details may be omitted where they are more clearly seen in other views.

Describing the structure in detail, the truck comprises a bottom side frame or equalizer member generally designated 2 having a substantially horizontal midportion of rectangular section with which may be formed integral end portions 4, 4 formed and arranged for engagement as at 8, 8 with the tops of associated journal boxes 10, 10 within which may be received in usual manner the journal ends of spaced wheel and axle assemblies 12 and 14. Each of the end portions 4, 4 may comprise an integral inturned bracket as hereinafter more fully described. The horizontal midportion of the equalizer member 2 may be formed at each end thereof with a spring seat 16 on which may be positioned a plurality of springs diagrammatically indicated at 15 affording a support for the superposed frame member generally designated 17, the side portions of said frame member being afforded spring seats at 18, 18 flanged over as at 20, 20, said flanges being continued into the inner of the pedestal jaws 22, 22, said jaws defining journal openings 23, 23 at the ends of said frame member within which openings may be positioned the journal boxes 10, 10 in the usual manner. The top frame member 17 has integrally formed spaced transoms 24, 24 serving as a usual means of support for a swing bolster (not shown) which may be confined therebetween and which serves as a bearer for the supported car body.

At either side of each wheel and axle assembly are the inner brake heads 26, 26 and the outer brake heads 28, 28, said heads supporting brake shoes (not shown) for frictional engagement with the peripheries of the associated wheels. Each of the brake heads 26 and 28 is engaged as at 30 in the usual manner with the associated brake beam 32, said beam being supported from the equalizer member 2 in a manner hereinafter more fully described. The inner beams 32, 32 associated with the inner brake heads 26, 26 are secured as at 29, 29 to the upper ends of hangers 31, 31, the lower ends of which are pivotally mounted as at 33, 33 in the jaws 34, 34 (Figure 1, left) formed on the brackets 36, 36 which are integrally formed on the inboard face of the equalizer 2 well below the axle level and intermediate the wheel and axle assemblies 12 and 14. Combination balance and safety hangers 38, 38 are secured as at 39, 39 to balance hanger brackets 41, 41 secured as at 40, 40 (Figure 1, left) to the inboard ends of the brackets 36, 36, said hangers being pivotally connected as at 42, 42 to the fulcrums 44, 44 (Figure 1, right) formed on said inner beams. The outer beams 32, 32, associated with the outer brake heads 28, 28, are secured as at 46, 46 to the lower ends of hangers 48, 48, the upper ends of which are pivotally connected as at 50, 50 to the jaws 52, 52 on the inturned brackets 54, 54 integrally formed on the ends of the equalizer 2 and well above the axle level. Combination safety and balance hangers 56, 56 are secured as at 57, 57 to balance hanger brackets 59, 59 supported as at 58, 58 from the inboard ends of the brackets 54, 54, said hangers being connected at the lower ends thereof as at 60, 60 to the fulcrums 62, 62 formed on the outer beams 32, 32.

The dead truck levers 64, 64 are fulcrumed at their upper ends as at 66, 66 to the fulcrum brackets 68, 68 pivotally connected as at 70, 70 to the jaws 72, 72 (Figure 1, left) formed at the ends of the frame member 17, and said levers 64, 64 are connected at the lower ends thereof as at 74, 74 to the fulcrums 76, 76 secured as at 77, 77 (Figure 1, right) to the outer beams 32, 32. The live truck levers 78, 78 are connected at their lower ends as at 80, 80 to the fulcrums 82, 82 secured as at 84, 84 to the inner brake beams 32, 32. The truck levers associated with respective wheels are connected by pull rods 86, 86 pivotally connected as at 88, 88 to the live truck levers intermediate the ends thereof, and pivotally connected as at 90, 90 to the dead truck levers intermediate the ends thereof, each pull rod 86 being provided with slack adjuster means designated 92 of well known form. The upper ends of the live truck levers 78, 78 are pivotally connected as at 93, 93 to the links 94, 94, the opposite ends of which are connected as at 95, 95 to the inner end of the live cylinder lever 96 and to the inner end of the dead cylinder lever 98 respectively. The outer end of the live cylinder lever is connected as at 100 to the piston rod 102 of the cylinder unit 104 which is supported as at 106, 106 from the cylinder pads 109, 109 formed on the upper frame member 17. The dead cylinder lever 98 is connected at its outer end as at 108 to the automatic slack adjuster device 110 secured as at 112, 112 to the cylinder unit 104, and said dead cylinder lever is pivotally and adjustably connected intermediate its ends as at 113 to the pull rod 114, the opposite end of which is pivotally connected as at 116 to the live cylinder lever 96 intermediate its ends.

In operation the cylinder unit 104, through the piston rod 102, moves the live cylinder lever 96 in a counter-clockwise direction, thereby actuating the brake rigging at one end of the truck through the live truck lever 78 associated with the live cylinder lever 96. At the same time, the live cylinder lever 96, by means of the pull rod 114, causes the dead cylinder lever 98 to move in a clockwise direction, thus actuating the brake rigging at the opposite end of the truck, as will be clearly apparent to those skilled in the art, through the live truck lever 78 connected to the dead cylinder lever 98.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a frame member, spaced supporting wheel and axle assemblies, equalizers supported from said assemblies and affording a resilient support for said frame member, power means secured to said frame member, and brake rigging comprising brake beams outwardly of said assemblies and supported from a point above the axle level by said equalizers, brake beams intermediate the wheels and supported from a point below the axle level by said equalizers, interconnected live and dead truck levers at opposite sides of each assembly and connected to respective beams, and an operative connection between said power means and said live truck levers, said connection comprising live and dead cylinder levers connected at corresponding ends thereof to opposite ends of said power means, connected at opposite corresponding ends thereof to said live truck levers and connected intermediate the ends thereof to each other.

2. In a railway car truck, a frame member, spaced supporting wheel and axle assemblies, equalizers supported from said assemblies and affording a resilient support for said frame member, brackets formed on said equalizers intermediate the wheels and below the axle level, brackets formed on respective ends of said equalizers and above the axle level, power means secured to said frame member, and brake rigging comprising brake beams supported from respective brackets at opposite sides of each assembly, said beams being operatively connected to said power means, said connection comprising interconnected live and dead truck levers engaged with respective beams, live and dead cylinder levers connected at corresponding ends thereof to said power means, intermediate the ends thereof to each other, and at opposite corresponding ends thereof to respective live truck levers.

3. In a railway car truck, an equalizer, a frame member resiliently supported thereon, spaced supporting wheel and axle assemblies, brake rigging comprising brake beams intermediate said assemblies and supported from below the axle level by said equalizer, brake beams outwardly of said assemblies and supported from said equalizer, power means mounted on said frame member, and an operative connection between said brake beams and said power means, said connection comprising interconnected live and dead truck levers supported at opposite sides of each assembly and connected with respective beams, said dead truck lever being fulcrumed from said frame member by means of a bracket pivotally connected at opposite ends thereof to said dead truck lever and to said frame member, and interconnected live and dead cylinder levers connected at corresponding ends thereof to said power means and at opposite corresponding ends thereof to said live truck levers.

4. In a railway car truck, a frame member, spaced supporting wheel and axle assemblies, equalizers supported from said assemblies at opposite sides of the truck and affording a resilient support for said frame member, power means secured to said frame member, and brake rigging comprising brake beams supported outwardly of said assemblies from a point above the axle level by said equalizers, brake beams intermediate the wheels and supported from a point below the axle level by said equalizers, interconnected live and dead truck levers at opposite sides of each assembly and connected to respective beams, each of said dead truck levers being connected to one end of a fulcrum, the opposite end thereof being pivotally connected to said frame member, and an operative connection between said power means and said live truck levers.

5. In a railway car truck, a frame member, spaced supporting wheel and axle assemblies, equalizers supported from said assemblies at opposite sides of the truck and affording resilient support for said frame member, power means secured to said frame member, and brake rigging comprising brake beams supported from said equalizers at opposite sides of each assembly, interconnected live and dead truck levers associated with respective of said beams, and an operative connection between said power means and said live truck levers, said operative connection comprising interconnected live and dead cylinder levers connected at corresponding ends thereof to said power means and at opposite corresponding ends thereof to respective live truck levers.

6. In a railway car truck, a lower frame member, an upper frame member resiliently supported thereon and affording support means for an associated bolster, spaced supporting wheel and axle assemblies, power means mounted on one of said members, and brake rigging comprising brake beams supported from the other of said members at opposite sides of each assembly, interconnected live and dead truck levers associated with respective beams and an operative connection between said live truck levers and said power means, said connection comprising live and dead cylinder levers connected at corresponding ends thereof to said power means and at opposite corresponding ends thereof to said live truck levers, and a pull rod connecting said cylinder levers at corresponding points intermediate the ends thereof, said upper member having journal means associated with said assemblies.

7. In a railway car truck, a frame member, spaced supporting wheel and axle assemblies, equalizers supported from said assemblies at opposite sides of the truck and affording a resilient support for said frame member, power means secured to said frame member, and brake rigging comprising brake beams outwardly of said assemblies and supported from a point above the axle level by said equalizers, brake beams intermediate the wheels and supported from a point below the axle level by said equalizers, interconnected live and dead truck levers at opposite sides of each assembly and connected to respective beams, and an operative connection between said power means and said live truck levers.

8. In a railway car truck, a frame member, spaced supporting wheel and axle assemblies, equalizers supported from said assemblies and affording a resilient support for said frame member, brackets formed on said equalizers intermediate the wheels and below the axle level, brackets formed on respective ends of said equalizers and above the axle level, power means secured to said frame member, and brake rigging comprising brake beams supported from respective brackets, said beams being operatively connected to said power means.

9. In a railway car truck, a frame member, spaced supporting wheel and axle assemblies, equalizers supported from said assemblies and affording resilient support for said frame member, power means secured to said frame member, and brake rigging comprising brake beams supported from said equalizers at opposite sides of each assembly, interconnected live and dead truck levers associated with respective of said beams, and an operative connection between said power means and said live truck levers.

10. In a railway car truck, an equalizer, an upper frame member resiliently supported thereon, spaced supporting wheel and axle assemblies, power means mounted on said frame member, and brake rigging comprising brake beams supported from said equalizer at opposite sides of each assembly, certain of said beams being supported from a point beneath the axle level, interconnected live and dead truck levers at opposite sides of each assembly and associated with respective beams, and an operative connection between said power means and said live truck levers.

11. In a railway car truck, a frame member, spaced supporting wheel and axle assemblies, equalizers supported from said assemblies and affording a resilient support for said frame member, brake rigging comprising brake beams supported outwardly of said assemblies from a point above the axle level by said equalizers, brake beams intermediate the wheels and supported from below the axle level by said equalizers, interconnected live and dead truck levers associated with respective beams, and power means associated with said live truck levers.

12. In a railway car truck, a lower frame member, an upper frame member resiliently supported thereon, means on said upper member affording support for an associated bolster, spaced supporting wheel and axle assemblies, power means mounted on one of said members, and brake rigging comprising brake beams supported from the other of said members at opposite sides of each assembly, interconnected live and dead truck levers associated with respective beams and an operative connection between said live truck levers and said power means, said upper member having journal means associated with said assemblies.

13. In a railway car truck, an equalizer, an upper frame member resiliently supported thereon and affording support for an associated bolster, spaced supporting wheel and axle assemblies, power means mounted on one of said members, and brake rigging comprising brake beams supported from the other of said members at opposite sides of each assembly, live and dead truck levers associated with respective beams and connected to each other, and an operative connection between said power means and said live truck levers, said upper member having journal means at opposite ends thereof and associated with said assemblies.

14. In a railway car truck, an equalizer, a frame member resiliently supported thereon, spaced supporting wheel and axle assemblies, brake rigging comprising hangers intermediate said assemblies and mounted at the lower ends thereof on said equalizer, brake hangers outwardly of said assemblies and mounted at the upper ends thereof on said equalizer, brake beams supported from respective hangers, and power means operatively associated with said beams.

15. In a railway car truck, a lower frame member, an upper frame member supported thereon, spaced supporting wheel and axle assemblies, brake rigging comprising hangers intermediate said assemblies and connected at the lower ends thereof to one of said members and hangers outwardly of said assemblies connected at the upper ends thereof to said last-mentioned member, brake beams supported from respective hangers, and power means operatively associated with said brake beams.

16. In a railway car truck, an equalizer member, a frame member resiliently supported thereon, spaced supporting wheel and axle assemblies, brake rigging comprising brake beams intermediate said assemblies and supported from below the axle level by said equalizer member, brake beams outwardly of said assemblies and supported from said equalizer member, and a power cylinder carried by one of said members and operatively connected to said brake beams, said operative connection including interconnected live and dead truck levers at opposite sides of each assembly.

17. In a railway car truck, a lower frame member, an upper frame member resiliently supported thereon, spaced supporting wheel and axle assemblies, brake rigging comprising brake hangers, certain of said hangers being connected at the lower ends thereof and other of said hangers being connected at the upper ends thereof to one of said members, brake beams supported from respective hangers, and power means operatively associated with said beams.

18. In a railway car truck, a lower frame member, an upper frame member resiliently supported thereon, spaced supporting wheel and axle assemblies, brake rigging comprising brake hangers, certain of said hangers being connected at the lower ends thereof to one of said members, brake beams supported from respective hangers, and power means operatively connected to said beams, said operative connection including interconnected live and dead truck levers at opposite sides of each assembly.

19. In a railway car truck, an equalizer member, an upper frame member resiliently supported thereon, spaced supporting wheel and axle assemblies, a power cylinder mounted on said frame member, and brake rigging comprising brake beams supported from said equalizer at opposite sides of each assembly and operatively associated with said means, said upper member having journal means associated with said assemblies.

20. In a railway car truck, an equalizer, a frame member resiliently supported thereon, spaced supporting wheel and axle assemblies, brake rigging comprising brake beams supported from said equalizer, and a power cylinder supported from the truck and operatively connected to said brake beams, said operative connection including live and dead truck levers at opposite sides of each assembly, said dead truck levers being supported from said frame member.

21. In a brake arrangement, a railway car truck, a supporting wheel and axle assembly, hangers at one side of said assembly and supported at their lower ends from said truck, hangers supported from said truck at the opposite side of said assembly, brake beams supported by said hangers, and actuating means operatively associated with said beams, said actuating means comprising interconnected live and dead truck levers at opposite side of said assembly.

22. In a brake arrangement, a railway car truck, a supporting wheel and axle assembly, a hanger at one side of said assembly and supported at the lower end from said truck, a hanger supported from said truck at the opposite side of said assembly, friction means supported by said hangers for engagement with said wheel, and actuating means operatively associated with said friction means, said actuating means including interconnected live and dead truck levers at opposite sides of said assembly.

23. In a railway car truck, a lower frame member, spaced supporting wheel and axle assemblies, an upper frame member resiliently mounted on said lower member adjacent each of said assemblies, and clasp brake rigging including hangers supported at opposite sides of each assembly from said lower member, friction means associated with said hangers, and actuating means for said friction means including interconnected live and dead truck levers at opposite sides of each assembly.

24. In a brake arrangement for a railway car truck, an equalizer member, a truck frame member resiliently supported thereon, a wheel and axle assembly affording an unsprung support for said equalizer member, said truck frame member having journal means associated with said assemblies, brake rigging hung from one of said members for braking said assembly, and a power cylinder mounted on the other member for actuating said rigging.

25. In a brake arrangement for a railway car truck, an equalizer member, a truck frame member resiliently supported thereon, a wheel and axle assembly affording an unsprung support for said equalizer member, journal boxes associated with the ends of said assembly, brake rigging hung from the equalizer member for braking said assembly, and a power cylinder mounted on the frame member for actuating said rigging, said truck frame member having spaced pedestal jaws embracing each of said journal jaws.

26. In a brake arrangement for a railway car truck, an equalizer member, a truck frame member resiliently supported thereon, a wheel and axle assembly affording an unsprung support for said equalizer member, brake rigging hung from the equalizer member, and actuating means including live and dead truck levers at opposite sides of said assembly and associated with said brake rigging.

27. In a railway car truck, a lower frame member, spaced supporting wheel and axle assemblies, an upper frame member resiliently mounted on said lower member and having journal means associated with said assemblies, a clasp brake rigging including hangers supported at opposite sides of each assembly from said lower member, friction means associated with said hangers, and actuating means for said friction means including interconnected live and dead truck levers at opposite sides of each assembly, said dead levers being fulcrumed from said upper member.

28. In a railway car truck, an equalizer, supporting wheel and axle assemblies, a truck frame resiliently mounted on said equalizer, and brake hanger brackets on said equalizer at opposite sides of each assembly, certain of said brackets being partially housed within said truck frame.

29. In a railway car truck, an equalizer, supporting wheel and axle assemblies, a truck frame resiliently mounted on said equalizer, and brake hanger brackets on said equalizer at opposite sides of each assembly, certain of said brackets being disposed below the axle level and other of said brackets being disposed above the axle level, the last mentioned brackets being partially housed within portions of said truck frame.

30. In an equalizer for a railway car truck, a member having a midportion affording support for associated springs and upstanding end portions for engagement with associated journal boxes, and brake hanger brackets on said member, certain of said brackets being on said midportion and other of said brackets being on the extremities of respective end portions, all of said brackets being disposed on one side of said member.

31. In a railway car truck, a frame member, spaced supporting wheel and axle assemblies, equalizers supported from said assemblies and affording resilient support for said frame member, brake rigging comprising friction means supported outwardly of said assemblies from a point above the axle level by said equalizers, friction means intermediate the wheels and supported from below the axle level by said equalizers, interconnected live and dead truck levers at opposite sides of each assembly and associated with respective friction means, and power means associated with said live truck levers.

32. In a railway car truck, an equalizer, a frame member resiliently supported thereon, spaced supporting wheel and axle assemblies, brake means comprising hangers intermediate said assemblies and mounted at the lower ends thereof on said equalizer, brake hangers outwardly of said assemblies and mounted at the upper ends thereof on said equalizer, friction means supported from respective hangers, and power means operatively associated with said friction means.

CARL E. TACK.